Oct. 30, 1951 — C. GERST — 2,573,135

MULTIPLE CLUTCH MECHANISM

Filed Nov. 7, 1947 — 4 Sheets-Sheet 1

INVENTOR.
CHRIS GERST

Oct. 30, 1951     C. GERST     2,573,135
MULTIPLE CLUTCH MECHANISM

Filed Nov. 7, 1947     4 Sheets-Sheet 2

INVENTOR.
CHRIS GERST
BY
Gustav A. Wolff
ATT.

Oct. 30, 1951         C. GERST         2,573,135
MULTIPLE CLUTCH MECHANISM

Filed Nov. 7, 1947         4 Sheets-Sheet 3

INVENTOR.
CHRIS GERST
BY
*Gustav A. Wolff*
ATT.

Oct. 30, 1951  C. GERST  2,573,135
MULTIPLE CLUTCH MECHANISM
Filed Nov. 7, 1947  4 Sheets-Sheet 4
Fig. 10  Fig. 11  Fig. 12
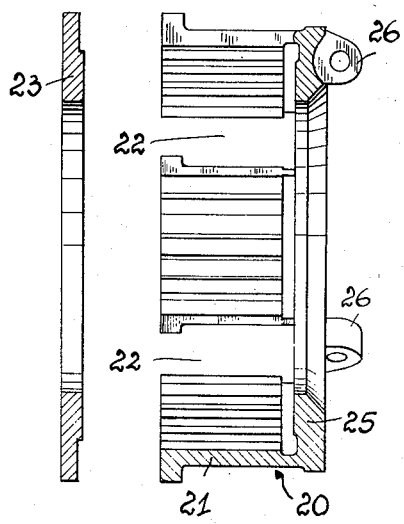
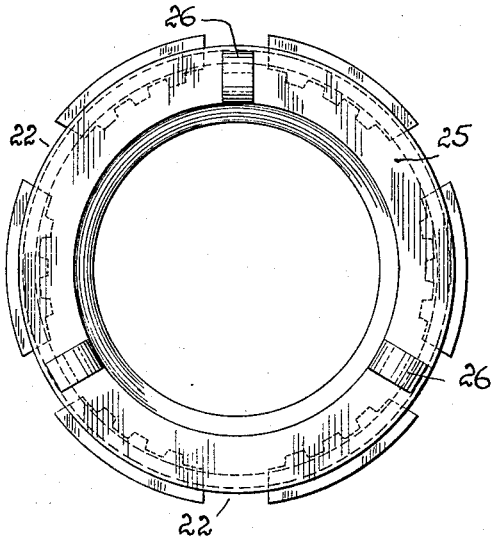
Fig. 13
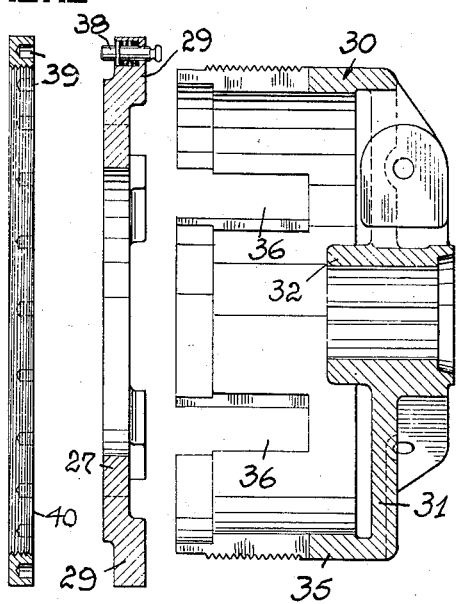
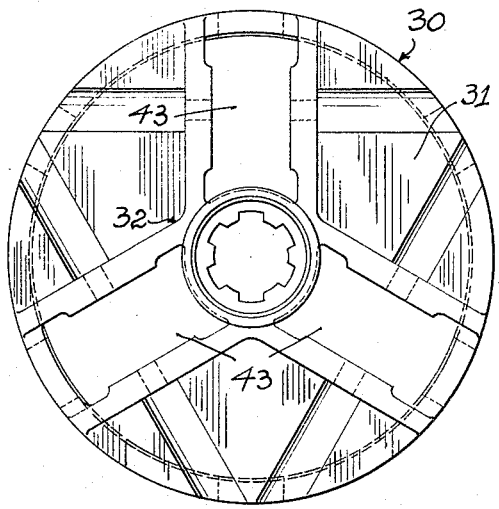
Fig. 14  Fig. 15  Fig. 16
INVENTOR.
CHRIS GERST
BY
Gustav A. Wolff
ATT Patented Oct. 30, 1951

2,573,135

UNITED STATES PATENT OFFICE 2,573,135

MULTIPLE CLUTCH MECHANISM

Chris Gerst, Detroit, Mich., assignor to The Transmission & Gear Company, Dearborn, Mich., a corporation of Michigan Application November 7, 1947, Serial No. 784,681

12 Claims. (Cl. 192—48)

1

This invention relates in general to friction clutches in which independently rotatable driving and driven members are coupled with each other by a plurality of friction disks, brought into frictional cooperation by clamping the disks between backing and pressure plate structures, and is more particularly concerned with improvements in dual friction clutches of the type disclosed in my copending application for "Clutch Mechanism," Ser. No. 728,842, filed February 15, 1947, now Patent No. 2,551,939, issued May 9, 1951. This type of frictional clutches includes a pressure plate structure with axially spaced pressure plates and a backing plate structure positioned between the spaced pressure plates and cooperating therewith in selectively actuating clutch disk assemblies by shifting of the pressure plate structure with respect to the backing plate structure in opposite directions.

The primary object of the present invention is the provision of an improved two-way friction clutch of the type referred to above which includes a pressure plate structure having axially spaced pressure plates, a backing plate structure positioned between the pressure plates, and clutch disk assemblies positioned between the pressure plates at opposite sides of the backing plate structure for selective actuation of the clutch disk assemblies by axial shifting of the pressure plate structure with respect to the backing plate structure in opposite directions.

Another object of the invention is the provision of a two-way friction clutch of the type referred to above which includes cooperating, slidably engaged backing plate and pressure plate structures, of which the backing plate structure is positioned between axially spaced pressure plates of the pressure plate structure which includes clutch disk assemblies positioned between the pressure plates and the backing plate structure at opposite sides thereof, and which includes shiftable means operatively engaged with the pressure plate structure for selectively actuating the clutch disk assemblies when the pressure plate assembly is shifted with respect to the backing plate structure in opposite directions.

A further object of the invention is the provision of a two-way friction clutch of the type referred to above, in which the pressure plate structure and the shiftable means are operatively engaged with each other by a rocking clutch lever member pivoted to the backing plate structure and linked to the pressure plate structure.

Still another object of the invention is the provision of a two-way friction clutch of the type referred to above, in which the backing plate structure embodies two axially spaced backing plates axially shiftably mounted with respect to each other to permit joint and individual adjustment of the backing plates of the backing plate structure with respect to the pressure plates of the pressure plate structure.

With the above and other incidental objects in view, the invention has other marked improvements and superiorities which radically distinguish it from presently known structures. These improvements or superior characteristics embodying certain novel features of construction are clearly set forth in the appended claims, and a preferred embodiment of the invention is hereinafter shown with reference to the accompanying drawings forming part of the specification.

In the drawings:

Figs. 10 through 16 show the pressure plate and backing plate structures of the two-way clutch in disassembled condition, thus Fig. 10 is a sectional view through a pressure plate of the pressure plate structure;

Fig. 11 is a sectional view through the body member of the pressure plate structure, and Fig. 12 is an end view of the body member shown in Fig. 11;

Fig. 13 is a sectional view through one of the adjusting rings for one of the backing plates of the backing plate structure;

Fig. 14 is a sectional view through the backing plate which cooperates with the adjusting ring shown in Fig. 13;

Fig. 15 is a sectional view through the body of the backing plate structure, and Fig. 16 is an end view of the body shown in Fig. 15.

Figures 1, 2, 3:
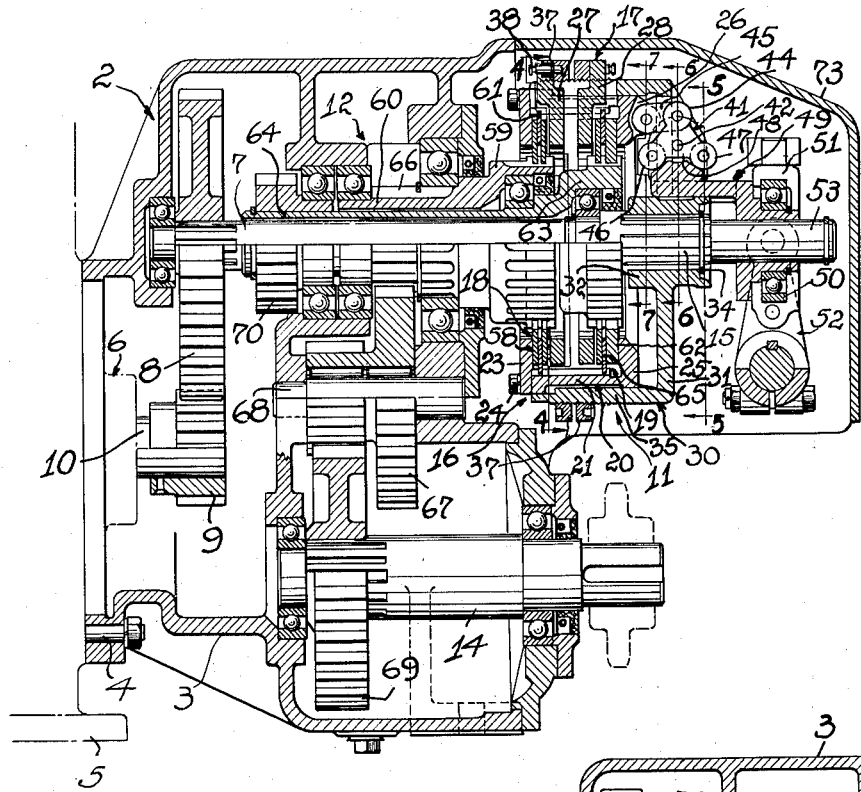
Fig. 1 is a longitudinal sectional view through a reversible transmission embodying a two-way clutch structure according to the invention for direct and reverse rotation of the output shaft of the transmission.
Fig. 2 is a longitudinal fragmentary sectional view through the reversible transmission disclosing the reversible gearing.
Fig. 3 is a diagrammatical view of the gearing of the transmission shown in Fig. 1.
Figure 4:
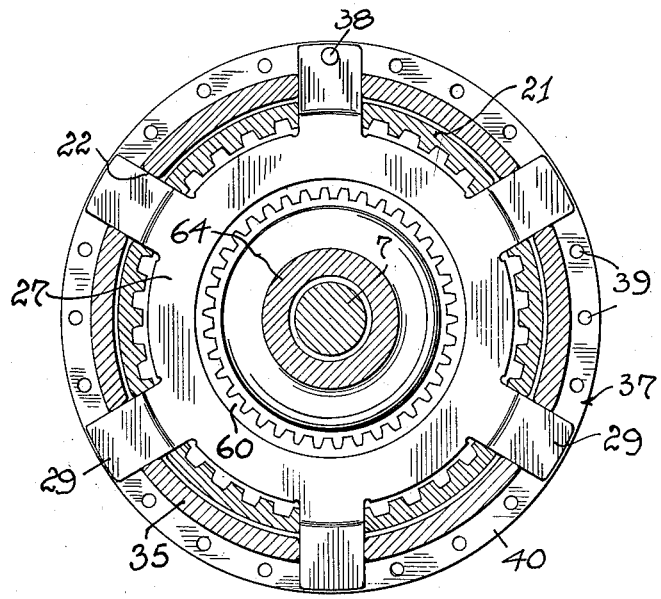
Fig. 4 is a cross sectional view through the two-way clutch structure shown in Fig. 1, the section being taken on line 4—4 of Fig. 1.
Figure 5:
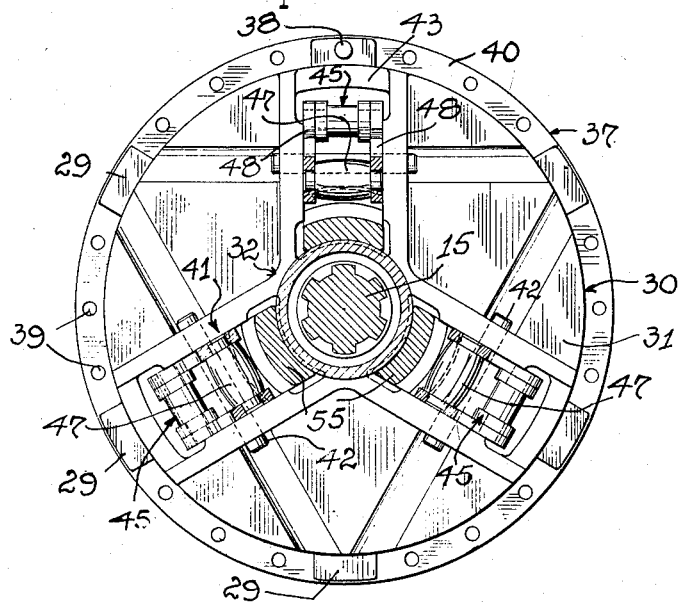
Fig. 5 is another cross sectional view through the two-way clutch structure shown in Fig. 1, the section being taken on line 5—5 of Fig. 1.
Figure 6:
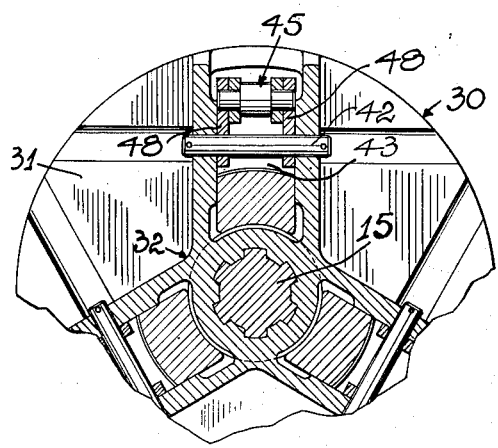
Fig. 6 is a fragmentary cross sectional view taken on line 6—6 of Fig. 1.
Figure 7:
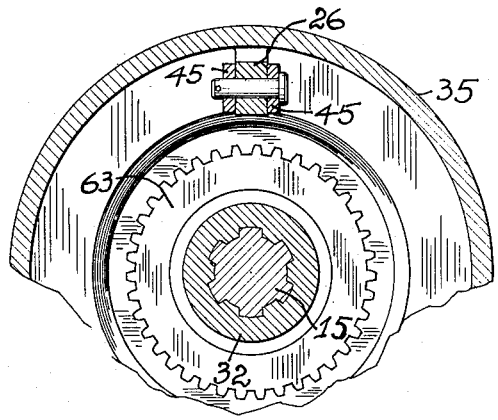
Fig. 7 is another fragmentary cross sectional view taken on line 7—7 of Fig. 1.
Figure 8:
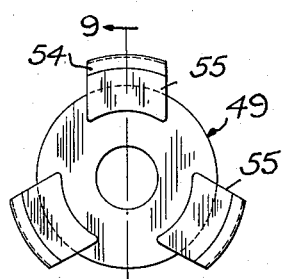
Fig. 8 is a front elevation of the slide member actuating the rocking member to effect shifting of the pressure plate structure.
Figure 9:
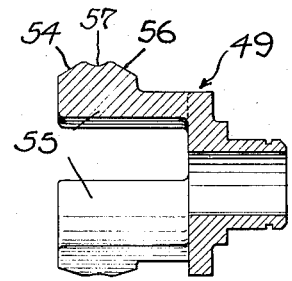
Fig. 9 is a sectional view through the slide member shown in Fig. 8, the section being taken on line 9—9 of Fig. 8.

Referring now more particularly to the exemplified form of the transmission and clutch structure shown in the drawings, reference numeral 2 denotes a transmission embodying a housing 3 which is secured at its one end by bolts 4 to the housing 5 of a motor 6. Housing 3 has journaled therein a main shaft 7 which is directly coupled by gears 8 and 9 with the drive shaft 10 of motor 6 and selectively coupled by a two-way clutch structure 11 and gearing 12, later to be described, with the output shaft 14 of transmission 2.

The two-way clutch structure 11, which is supported on the splined portion 15 of main shaft 7, embodies a pressure plate structure 16 and a backing plate structure 17 slidably and non-rotatably coupled with each other for joint rotation by shaft 7. These pressure plates and backing plate structures are non-rotatably and axially shiftably interengaged with each other, so that pressure structure 16 is arranged substantially within backing plate structure 17 to effect selective coupling of main shaft 7 with output shaft 14 by either one of two individual clutch disk assemblies 18 and 19 arranged within the pressure plate structure at opposite sides of the backing plate structure.

Pressure plate structure 16 consists of a cylindrical body 20, the peripheral wall 21 of which is radially slotted to provide body 20 with a plurality of radial slots 22. This body has one end partly closed by a ring-shaped plate 23, secured to body 20 by bolts 24, and its other end inwardly flanged to provide the body with a flanged portion 25 opposed to ring-shaped plate 23. In addition body 20 includes ear portions 26 integrally extended from the outside face of flanged portion 25.

The thus constructed pressure plate structure 16 is slidably and non-rotatably engaged with the backing plate structure 17 which includes backing plates 27, 28 positioned between the ring-shaped plate 23 and the flanged portion 25 of the pressure plate structure and slidably and non-rotatably engaged with the peripheral wall 21 of said pressure plate structure by radial driving lugs 29 extended through the radial slots 22.

Backing plate structure 17 embodies a cup-shaped body 30 which is dimensioned to be sleeved upon the body 20 of pressure plate structure 16 and has extended from its wall 31 an internally splined, slotted hub member 32 mounting body 30 on the splined portion 15 of main shaft 7 and securely held in proper position by a snap-ring 34. The peripheral wall 35 of body 30 is externally threaded and, in addition, radially slotted to provide said wall with a plurality of slots 36 sized and arranged to fit and align with the radial slots 22 in the body 20 of the pressure plate structure 16 to permit proper engagement of body 30 with the driving lugs 29 on backing plates 27, 28 of backing plate structure 17. These backing plates, which extend between the ring-shaped plate 23 and the flanged portion 25 of the pressure plate structure, are held in proper position by adjustment rings 37 threadedly engaged with the threaded peripheral wall of body 30 and held in adjusted position by spring-pressed plungers 38 extended into circumferentially arranged bores 39 in the side walls 40 of adjustment rings 37.

This arrangement of the backing plates 27 and 28 and their mounting provides a medium for adjusting the relative clamping position between the pressure plates and the backing plates, as the friction disks of clutch disk assemblies 18 and 19 wear and it becomes necessary to readjust the relative initial position between the pressure plates and backing plates owing to the fixed range of movement of the operating mechanism later to be described. Adjustment is effected by shifting of the backing plates when the adjustment rings 37, which are threadedly engaged with the body 30 of the backing plate structure, are rotated to effect axial shifting of the backing plates.

The pressure plate structure, which is thus slidably and non-rotatably supported by the backing plate structure, is shifted in opposite directions to actuate either one of the two clutch disk assemblies 18 and 19, later to be described, by dual clutch levers 41 pivotally mounted on shafts 42 bridging slots 43 in slotted hub member 32 of body 30. These dual clutch levers include a third lever arm 44 linking the dual clutch levers to the ear portions 26 of body 20 of pressure plate structure 16 by means of links 45 extended through slots 43. Dual clutch levers 41 each embody a pair of rollers 46, 47 rotatably mounted between oppositely arranged plates 48 and are actuated by a shifting member 49 which is coupled by a ball bearing 50 with a throw-out collar 51 actuated by a fork 52. The shifting member 49 is slidably mounted on the reduced end portion 53 of main shaft 7 and, when shifted toward the two-way clutch structure, engages with the inclined surfaces 54 of its extended jaws 55 the roller 46 of the dual clutch levers and effects tilting of these levers. Such tilting of the dual clutch levers effects shifting of the pressure plate structure toward the right until the clutch disk assembly 18 is tightly gripped between ring-shaped plate 23 and backing plate 27. When shifting member 49 is shifted in the opposite direction, away from the two-way clutch structure, rollers 47 of the dual clutch levers engage the oppositely inclined surface 56 of the jaws of the shifting member, so that the pressure plate structure is shifted toward the left until the clutch disk assembly 19 is tightly gripped between flanged portion 25 and backing plate 28. The shifting member 49, which includes on its jaws grooves 57 separating the oppositely inclined surfaces 54 and 56 from each other, is slidably and non-rotatably coupled with the backing plate structure by dimensioning jaws 55, so that these jaws snugly and slidably fit the slots 43 in body 30.

The thus described positive locking type clutch structure which includes a readily accessible, effective adjusting means is particularly well suited to be placed on the outside of the housing of a transmission to facilitate quick and economical servicing and repairing of the clutch structure without disassembly of the transmission necessary in conventional constructions having their clutches located within their housings.

Coupling of the clutch structure with a transmission is effected by clutch disk assemblies 18 and 19. Thus, clutch disk assembly 18 includes friction driven disks 58, non-rotatably and axially shiftably secured to the enlarged splined end portion 59 of a driven tubular shaft 60, arranged rotatably and concentrically with respect to the main shaft 7, and a friction driving disk 61, non-rotatably and axially shiftably secured to the internally toothed peripheral wall 21 of body 20, and the clutch disk assembly 19 includes friction driven disks 62, non-rotatably and axially shiftably secured to the enlarged splined end portion 63 of a second driven tubular shaft 64 arranged rotatably and concentrically with respect to tubular shaft 60 and main shaft 7, and a friction driving disk 65, non-rotatably and axially shiftably secured to the internally toothed peripheral wall 21 of body 20.

Tubular shaft 60, the forward drive shaft, is coupled by its gear section 66, double idler gear 67 on countershaft 68 and gear 69 with the output shaft 14, and tubular shaft 64, the reverse drive shaft, is coupled by its pinion 70, double idler gear 71 on a second countershaft 72, double idler gear 67 on countershaft 68 and gear 69 with the said output shaft.

A hood-shaped cover member 73 secured to housing 3 protects the described clutch structure and permits ready and easy access for adjustment and repair.

In describing the operation of the two-way clutch structure it will be assumed that, as shown in Fig. 1, the pressure plate structure is in neutral position and main shaft 7 and hence all elements of the clutch structure, except friction driven disks 58 and 62, are rotating. If it is desired to directly drive output shaft 14 in the same direction as main shaft 7, fork 52 is actuated to shift shifting member 49 toward the clutch structure to tilt dual clutch levers 41 outwardly and shift the pressure plate structure toward the right until clutch disk assembly 18, arranged between ring-shaped plate 23 and backing plate 27, is actuated and couples main shaft 7 with tubular shaft 60 effecting by means of gear section 66, double idler gear 67 and gear 69 rotation of the output shaft 14 in the direction of rotation of main shaft 7. A reverse drive is transmitted to output shaft 14 when fork 52 is actuated to shift shifting member 49 away from the clutch structure to tilt dual clutch levers 41 inwardly and shift the pressure plate structure toward the left until clutch disk assembly 19, arranged between flanged portion 25 and backing plate 28, is actuated and couples main shaft 7 with tubular shaft 64, effecting by means of pinion 70, double idler gear 71, double idler gear 67 and gear 69 rotation of the output shaft 14 in a direction opposite to the rotation of main shaft 7.

Having thus described my invention:
What I claim is:

1. In dual clutch mechanism, the combination of two clutch devices including jointly a single backing plate structure fixed against axial movement, a single shiftable pressure plate structure with a body and two laterally spaced pressure plate means mounted on said body, said pressure plate means having said backing plate structure partly arranged therebetween, a single dual clutch lever pivotally mounted on said backing plate structure and linked to the pressure plate structure, and shiftable means adapted to tilt said dual clutch lever in opposite directions to effect selective cooperation of either one of said pressure plate means with said backing plate structure.

2. In dual clutch mechanism, the combination of two clutch devices including jointly a single backing plate structure fixed against axial movement having laterally spaced backing plate means, and a single shiftable pressure plate structure with a body rigidly mounting two laterally spaced pressure plate means having the backing plate means of said backing plate structure arranged between the pressure plate means, said backing plate structure embodying a substantially cup-shaped body portion encircling and slidably mounting said shiftable pressure plate structure and axially adjustably supporting said backing plate means.

3. Dual clutch mechanism as described in claim 2, wherein the backing plate means consists of two backing plates axially slidably and non-rotatably interlocked with the cup-shaped body of said backing plate structure, and backing rings for said backing plates threadedly engaged with said body and adapted to adjust the backing position of said backing plates when such backing rings are rotated on said body.

4. Dual clutch mechanism as described in claim 2, wherein each backing plate means consists of a backing plate having lug portions radially extended therefrom, wherein the cup-shaped body includes radial slots in its peripheral wall, wherein the lug portions of each backing plate extend through the radial slots in said body and couple the backing plate axially slidably and non-rotatably with said body, and wherein each backing plate is adjustably held in proper working position by a backing ring threadedly engaged with the outwardly threaded peripheral wall of said body portion.

5. Dual clutch mechanism as described in claim 4, wherein one of the radial lugs of each of said backing plates mounts a spring-pressed plunger, and wherein each backing ring includes circumferentially arranged locking means cooperating with the respective spring-pressed plunger in locking the backing ring in its adjusted positions with respect to the backing plate.

6. In dual clutch mechanism, the combination of two clutch devices jointly including cooperating backing and pressure plate structures slidably and non-rotatably interengaged with each other, the backing plate structure including a body mounting two laterally spaced backing plate means, and the pressure plate structure including a body mounting two laterally spaced pressure plates having the backing plate means arranged therebetween, a single dual clutch lever pivotally mounted on said backing plate structure and linked to said pressure plate structure, and actuating means for said dual lever means slidably and non-rotatably engaged with said backing plate structure.

7. In dual clutch mechanism, the combination of two clutch devices jointly including cooperating backing and pressure plate structures slidably and non-rotatably interengaged with each other, the backing plate structure having a substantially cup-shaped body and backing plate means mounted in said body, and the pressure plate structure having two axially spaced pressure plates positioned in said body and having the backing plate means arranged therebetween, dual clutch lever means pivotally supported on said body and extended thereinto through slots in its wall, link means extending through the wall of said body thereinto and coupling said dual clutch lever means with said pressure plate structure, and actuating means for said dual clutch lever means including portions slidably and non-rotatably extended into said body through its slots for actuating said dual clutch lever means.

8. Dual clutch mechanism as described in claim 7, wherein said actuating means consists of an axially shiftable member axially aligned with said backing and pressure plate structures, said member having symmetrically arranged jaw members provided with oppositely inclined outer contact surfaces, wherein the jaw members of said actuating means extend slidably and non-rotatably into said body through said slots, and wherein the inclined contact surfaces of said jaw members engage the said dual clutch lever means to be adapted to effect shifting of the pressure plate structure in opposite directions when the actuating means are shifted in opposite directions.

9. Dual clutch mechanism as described in claim 7, wherein said actuating means consists of an axially shiftable member having symmetrically arranged jaw members provided with oppositely inclined outer contact surfaces separated by a locking groove between said surfaces, and wherein said jaw members extend through the slots into said body, contact with their inclined contact surfaces said dual clutch lever means when in neutral position and have the end portions of the dual clutch lever means resting in the grooves of said jaw members when the dual clutch lever means are shifted into clutching position.

10. In dual clutch mechanism the combination of two clutch devices including jointly a single backing plate structure including a cup-shaped body mounting backing plate means and a pressure plate structure including a body axially extended into said backing plate structure and axially shiftably supported thereby, said pressure plate structure embodying laterally spaced pressure plate means mounted on the body and having said backing plate means arranged therebetween, friction driving and driven clutch elements arranged within the body of said pressure plate structure, between the pressure plate means and backing plate means, and shifting means mounted on the cup-shaped body of said backing plate structure and linked to said clamping plate structures for selectively actuating said friction driving and driven clutch elements.

11. In dual clutch mechanism the combination of two clutch devices including jointly a backing plate structure having two adjustably supported backing plate members and a pressure plate structure encircled by said backing plate structure and axially shiftably mounted therein, said pressure plate structure embodying two axially spaced pressure plate means, said two backing plate members being positioned between the two pressure plate means, driving and driven clutch elements arranged between the pressure plate means and the respective backing plate members, and shifting means for said pressure plate structure adapted to effect selective actuation of the clutch devices when said pressure plate structure is shifted in opposite directions.

12. Dual clutch mechanism such as described in claim 11, including adjusting and backing means for said backing plate members said adjusting and backing means being mounted on said backing plate structure and encircling same.

CHRIS GERST.

REFERENCES CITED

The following references are of record in the file of this patent:

UNITED STATES PATENTS

| Number | Name | Date |
|---|---|---|
| 1,743,460 | Klausmeyer et al. | Jan. 14, 1930 |
| 1,845,332 | Reece et al. | Feb. 16, 1932 |
| 2,379,023 | Miller | June 26, 1945 |
| 2,396,456 | Campodonico | Mar. 12, 1946 |
| 2,472,750 | Lavash | June 7, 1949 |
| 2,488,540 | Hollingsworth | Nov. 22, 1949 |

FOREIGN PATENTS

| Number | Country | Date |
|---|---|---|
| 432,287 | Great Britain | July 24, 1935 |